United States Patent [19]
Britt

[11] 4,453,268
[45] Jun. 5, 1984

[54] OCR PAGE READER

[75] Inventor: Ronald H. Britt, Charlotte, N.C.

[73] Assignee: Lundy Electronics & Systems, Inc., Glen Head, N.Y.

[21] Appl. No.: 245,093

[22] Filed: Mar. 18, 1981

[51] Int. Cl.$^3$ .............................................. G06K 9/38
[52] U.S. Cl. ................................... 382/50; 358/282; 358/285; 382/53; 382/67
[58] Field of Search .................. 340/146.3 F, 146.3 B, 340/146.3 SY, 146.3 AG, 146.3 AC, 146.3 AQ, 146.3 J, 146.3 WD; 250/234, 235, 567, 568, 578; 350/6.2, 6.3; 358/285, 293, 282, 205, 206, 212, 213, 225; 235/436, 454, 470, 491; 382/37, 50, 51, 53, 65, 67

[56] References Cited

U.S. PATENT DOCUMENTS

| | | | |
|---|---|---|---|
| 2,975,966 | 3/1961 | Howard | 235/491 |
| 3,267,432 | 8/1966 | Bonner | 382/37 |
| 3,395,284 | 7/1968 | Smith | 382/65 |
| 3,701,099 | 10/1972 | Hall et al. | 340/146.3 AG |
| 3,840,856 | 10/1974 | Beall et al. | 340/146.3 WD |
| 3,883,737 | 5/1975 | Throssell et al. | 250/567 |
| 3,962,681 | 6/1976 | Requa et al. | 382/50 |
| 4,104,616 | 8/1978 | Isshiki et al. | 382/37 |
| 4,108,367 | 8/1978 | Hannan | 235/485 |
| 4,129,853 | 12/1978 | Althauser et al. | 340/146.3 AG |
| 4,132,977 | 1/1979 | Nagano | 340/146.3 AG |
| 4,149,091 | 4/1979 | Crean et al. | 358/293 |
| 4,150,873 | 4/1979 | Dali | 358/285 |
| 4,157,533 | 6/1979 | Du Vall | 340/146.3 AG |
| 4,180,800 | 12/1979 | Isshiki et al. | 340/146.3 MA |
| 4,234,867 | 11/1980 | Butin | 340/146.3 AG |
| 4,308,523 | 12/1981 | Schapira | 382/37 |
| 4,321,627 | 3/1982 | Hooker et al. | 358/285 |
| 4,356,389 | 10/1982 | Quirey et al. | 340/146.3 AG |

OTHER PUBLICATIONS

Textbook, Applications of Pattern Recognition, Editor K. S. Fu, Prof. E. E. Purdue, CRC Press, Inc., 1982, pp. 197–236.

Primary Examiner—Leo H. Boudreau
Attorney, Agent, or Firm—Brumbaugh, Graves, Donohue & Raymond

[57] ABSTRACT

An optical character recognition page reader includes a stationary paper guide for positioning documents illuminated by a stationary light source. An image of the documents is focused onto a stationary photosensitive device, e.g. a line of photodiodes, by a movable lens. Signals from the photodiodes are serially fed to a bit comparator which compares the amplitude of these signals to a threshold level that varies in accordance with a fraction of the previous maximum white level signal for each such photodiode, and produces digital bit outputs in response thereto. The digital bit outputs of the comparator for each horizontal scan of the document, i.e. each readout of the photodiode array, are stored for successive positions of the lens during its vertical scan of the document. The stored digital bits from a number of previous lens scan positions for a particular photodiode of the array are then used in a state machine to determine its next state. Bits from succeeding particular photodiodes are successively applied to that state machine to affect its state. The operation of the state machine is so conditioned that if it reaches its final state, it has uniquely identified a particular character from the stored bits.

5 Claims, 4 Drawing Figures

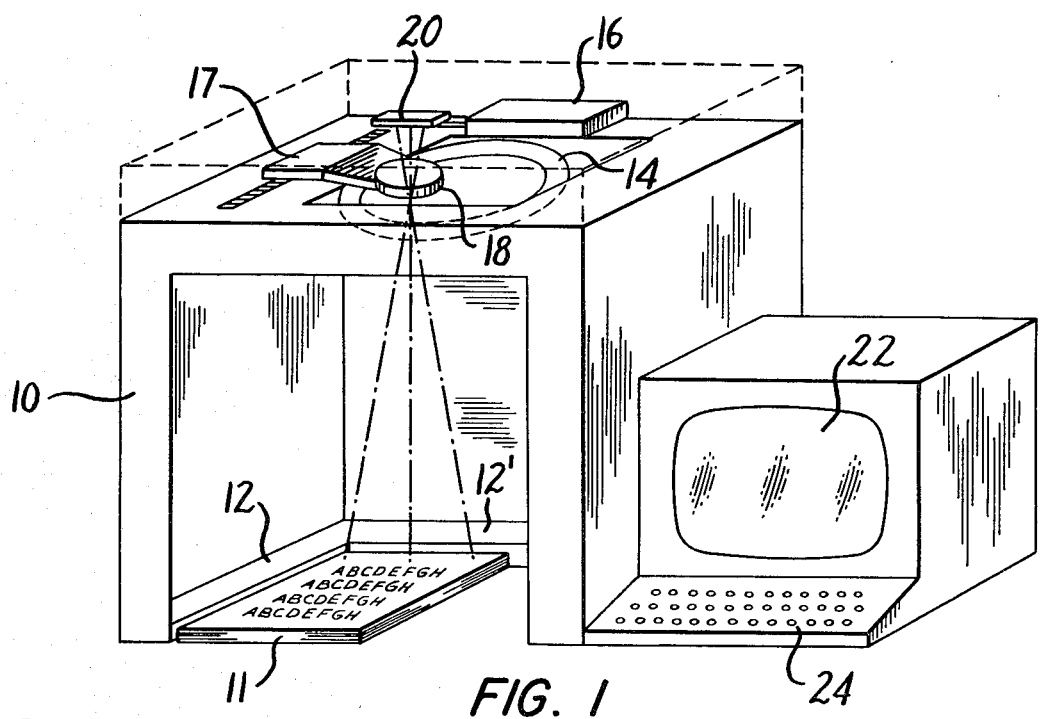
FIG. 1
Rows
| | 1 | 2 | 3 | 4 | 5 | 6 | 7 |
|---|---|---|---|---|---|---|---|
| 1 | 0 | 1 | 1 | 1 | 1 | 1 | 0 |
| 2 | 0 | 1 | 1 | 1 | 1 | 1 | 0 |
| 3 | 0 | 1 | 1 | 0 | 0 | 0 | 0 |
| 4 | 0 | 1 | 1 | 0 | 0 | 0 | 0 |
| 5 | 0 | 1 | 1 | 1 | 1 | 1 | 0 |
| 6 | 0 | 1 | 1 | 1 | 1 | 1 | 0 |
| 7 | 0 | 1 | 1 | 1 | 1 | 1 | 0 |
| 8 | 0 | 1 | 1 | 0 | 0 | 0 | 0 |
| 9 | 0 | 1 | 1 | 0 | 0 | 0 | 0 |
| 10 | 0 | 1 | 1 | 1 | 1 | 1 | 0 |
| 11 | 0 | 1 | 1 | 1 | 1 | 1 | 0 |
⟵ 1,728 Columns
FIG. 3
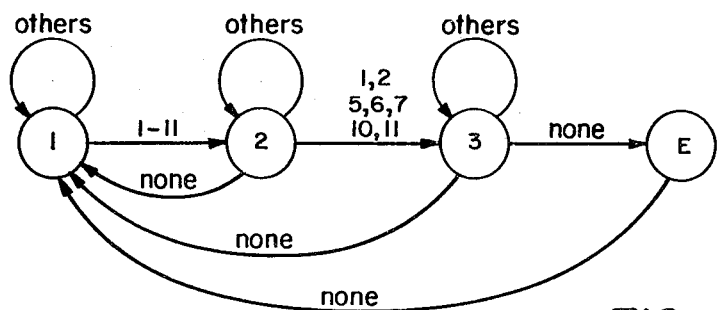
FIG. 4

OCR PAGE READER

BACKGROUND OF THE INVENTION

The present invention relates to optical character readers (OCR) and, more particularly, to OCR page readers.

Various OCR systems have been devised in the past for reading alphanumeric characters fixed on a page. Typically the page is scanned by moving the page past an optically-sensitive device, e.g. a photodiode array. As a result sophisticated, heavy and expensive paper handling equipment is needed, especially if the pages are to be automatically fed into the OCR system from a stack.

Since an OCR system usually has a lens for focusing the image of the page on the optically-sensitive device, there is a problem with obtaining a uniform amount of light to that device from various portions of the page because of the $\cos^4 \theta$ law. One method of overcoming this problem is to have the illumination move across the page as the scanning of the page proceeds. An alternative method trys to correct the problem by varying the amount of light over the page to compensate for the light intensity variations caused by the lens. Neither method has solved the problem adequately. The moving light solution also increases the mechanical complexity of the machine.

When photodiode arrays are used in OCR systems it is necessary to compensate for the variation in sensitivity between the individual photodiodes of the array. This has been done by calibrating the array at the factory and supplying it with a memory circuit with correction factors for each cell. However, such an arrangement would in no way compensate for illumination variations caused by the lens and lighting arrangement of the OCR system in which it is used or for variations in the reflectivity and color of the paper used in such a system. It has been proposed to compensate for paper changes by storing in a memory a number representing the maximum white level (i.e. paper background level) obtained by the entire photodiode array. This number is then incremented or decremented depending on whether the maximum signal received from the photodiodes of the array, within a particular period, represents a white level greater or less than that for the number which had been stored. These techniques, however, have not proved satisfactory in overcoming the various illumination problems in OCR systems, especially where the illumination is not uniform across the entire page.

In recognizing a character a signal from the optically-sensitive device is compared to a threshold in order to determine if that signal represents white, i.e. background, or black, i.e. part of a character. This information is then stored in a memory as rows of data bits corresponding to the scans of the page being read. In a typical system a section of the resulting memory array is analyzed to determine what character it represents. This is accomplished by a technique known as video framing in which a rectangular box is considered as being around the character under examination. This box has dimensions large enough to enclose the largest character expected. Once the character has been framed by locating the perimeter of the character bits in the memory that form it, the contents of the frame are passed to a second stage of recognition which identifies the contents of the box as a character. The determination of what character is in the memory section being analyzed is made by a plurality of separate circuits, each looking for the particular pattern of data bits that represents a unique character. In more sophisticated systems, e.g. those which can recognize hand-printed characters, patterns of interconnected and properly positioned character features are looked for in order to determine the character in the frame under examination. With a video framing system, however, additional logic is needed to locate the character in the memory section and to establish the frame about it.

SUMMARY OF THE INVENTION

The present invention is directed to providing an optical character recognition (OCR) page reader system which operates without complicated paper handling requirements, compensates for non-uniform illumination and can handle recognition without a separate framing operation. These objects are accomplished (i) by using a moving lens to focus the image of a stationary page on a stationary photodiode array, (ii) by dynamically and automatically controlling the effective gain of each photodiode of the photodiode array, and (iii) by using a recognition space scheme for recognizing the characters, instead of a video framing scheme.

In an illustrative embodiment of the invention a stack of documents to be read by the OCR system is positioned against stationary guides. Located above the stack is a stationary photodiode array that is surrounded by a circular fluorescent light driven at a frequency of about 20 KHZ. A movable lens is positioned between the stack of documents and the photodiode array. As the lens is moved in incremental steps, different portions of the top document in the stack are focused on the array, thus effectively causing the entire document to be scanned by a relatively short movement of the lens.

While the high frequency-driven, circular fluorescent light provides a generally uniform illumination of the document being scanned, the remaining minor variations in this illumination, as well as detection errors due to illumination variations caused by the lens and the relative sensitivities of the photodiodes of the photodiode array, are compensated by a dynamic, automatic gain control circuit. Assuming that the photodiode array contains 2,000 photodiodes in series, so as to be able to cover the focused width of the document with a sufficient number of samples to perform recognition, a memory containing 2,000 words is required for the gain circuit. Each word in memory represents the maximum, i.e. most white, signal that a particular cell has received. At each step in the movement of the lens, the signals generated in the array are read out serially. As a new signal for a particular photodiode is read out, it is compared to the pertaining previous maximum value stored in the memory for that photodiode. If the new signal is greater, the stored value is increased by one unit. Every few scans the stored value is decreased by one unit so that a steady value of illumination will cause the stored value to fluctuate back and forth about a particular level.

The stored value is used to set the threshold level for a black-white comparator that determines if the cell output is white, i.e. a background bit, or black, i.e. a character bit, whereby a digital 0 or 1, respectively, is produced. Since the stored value controls the threshold to the black-white comparator in response to the actual output of the cell at background positions on the document, comparing the threshold value with the photodiode output produces a black-white determination that has been compensated for paper quality, paper illumination, lens illumination fall-off at the corners, photodiode sensitivity and amplifier gain.

The digital bits from the black-white comparator for one scan, e.g. a string of 2,000 bits in the form of digital 1's and 0's, are stored as one row in a memory array. Successive scans are stored on succeeding rows of the memory array. This array can store more than a sufficient number of scans to cover the height of a character, e.g. about 32 scans. There is a separate recognition circuit for each character the system can recognize, although the logic units actually used may incorporate the circuits for two or more characters. Each recognition circuit continuously and sequentially looks at the stored data for the first photodiode from the previous scans, e.g. the first column of the last 32 rows of bits stored in memory and successive other columns of the array. The recognition circuits are state machines that look for the pattern in the columns of data bits that represents the character with which they are identified.

The three recognition circuits for the letters B, E and H, for example, will be looking for all 1's in a column, signaling the leftmost edge of these letters. Once this feature has been found the B and E circuits will change to a state in which they will be looking for 1's at the top, middle and bottom of the column. The H circuit will be looking for only 1's at the middle. If the character is actually a D, none of these circuits will see the feature they need for the second state and will not be able to move to their next state. If the character is an E, the H will not see the feature it needs, i.e. 1's in the middle only, and it will not advance. However, both the B and E circuit will see the feature they are seeking. In the final stage the B circuit will be seeking all 1's indicating closure at the rightmost edge of that character, while the E circuit will be looking for a continuation of the 1's at the top, middle and bottom. When the columns of memory representing the rightmost edge is checked and the E circuit's final state is satisfied, that circuit will produce an output, but the B circuit will not advance. When a number of columns are scanned and all zeros are detected, a gap between letters is indicated, which occurrence will cause all of the recognition circuits to be reset to their former states.

The information from the recognition circuits is then fed to other equipment which will process it, e.g. to a word processing system equipped with a cathode ray tube (CRT) display and a keyboard.

BRIEF DESCRIPTION OF THE DRAWINGS

The foregoing and other features of the invention will be more readily apparent from the following description of an illustrative embodiment and the accompanying drawings in which FIG. 1 is a schematic illustration of an optical character recognition page reader according to the present invention;

FIG. 3 is a diagram of recognition memory locations; and

FIG. 4 is a simplified state diagram for recognizing the character E.

DESCRIPTION OF AN ILLUSTRATIVE EMBODIMENT

Figure 2:
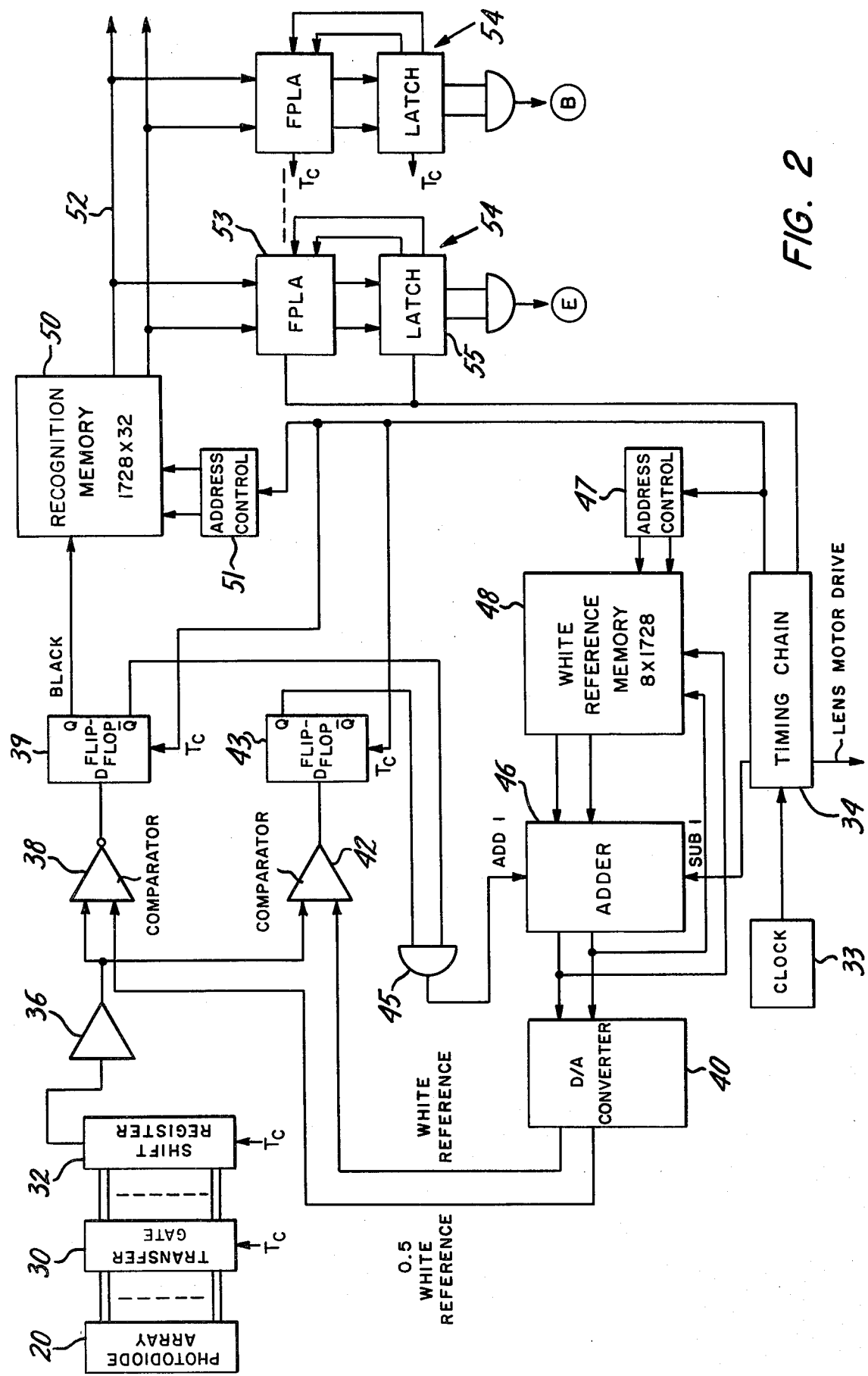
FIG. 2 is a block diagram of an electronic control circuit for the page reader of FIG. 1.

In FIG. 1 there is shown an optical character recognition page reader system. The system includes a reading station in the form of an enclosure 10 having its front side open. A stack 11 of documents to be read is positioned in the enclosure against guide rails 12,12' which are at right angles to each other. No elevator, paper separator or paper moving apparatus is used, thus saving on weight, expense and complexity. The documents stack is inserted manually and when the top sheet has been read, it is removed manually so as to expose the next document to be read. Since it takes about 8 seconds to scan a document and about 2 seconds to reset, the few seconds it takes to manually remove the top sheet will not adversely affect the throughput of the system.

The interior of the enclosure is illuminated by a 30 watt circular fluorescent light 14 driven at about 20 KHZ by an electronic control circuit 16. The light is driven at this high frequency because the page is scanned in about 8 seconds, which for an approximately 2,000 cell photodiode array means that each cell receives light for about 4 ms on each scan line. Since fluorescent lights actually go out between cycles, driving it at 60 HZ would cause the operation of the light to show up as a periodic variation in illumination. Besides driving the light at a high frequency, illumination variations are reduced by painting the interior of the enclosure white.

By means of a 35 mm lens 18, the image of a horizontal strip across the width of the top document is directed onto a photodiode array 20 having 1,728 individual photodiodes in a line. Such an array is available from Fairchild Semiconductor Co. as model No. CCD 122. The depth of field of the optical lens is such that a stack of 50 documents can be inserted in the enclosure and removed one at a time without any one of them being out of focus. The line of 1,728 photodiodes in combination with the position of the lens is sufficient to cover the entire width of a document 8½ inches wide such that each photodiode covers an area 5 thousandths inch wide and approximately 5 thousandths inch high. For a typical character in OCR-B font, this means it will take about three photodiode areas to cover the thickness of a typical line used in forming the characters, i.e. a character limb.

In order to scan the document the lens 18 is moved by a stepping-motor driven positioning table 17, such as that made by Instrument Industries of Andover, Mass. as model TM-20-SM, which motor system is also under the control of electronic control circuit 16. Such commercially available motor systems are capable of accurate movements of 0.5 thousandths inch, which is equivalent to a 5 thousandths inch movement on the document because of the position of the lens. A complete vertical scan, i.e. in the direction of guide 12, of a document with an 11 inch length, thus requires only a 1.1 inch movement of the lens. It is much easier to accomplish this lens movement to achieve a vertical scan of the document than to try to transport the document over a minimum 11 inch path, not only because it is a shorter distance, but because the lens is not flexible and hard to control as is a paper document.

Once the lens has been stepped completely down the document, the motor 17 is put into a fast reverse mode to reset it for reading the next document. During scanning electrical signals from the stationary photodiode array 20 are generated and fed to the electronic control unit 16, and during reset the operator removes the top document so the next one can be scanned. The characters represented by the signals generated during scanning are recognized and the resulting information is fed to any system to be used in conjunction with the page reader. For example it may be used with a word processing system having a CRT 22 and a keyboard 24 for displaying the text read from the document and editing it.

FIG. 2 is a schematic diagram of the significant portions of the electronic control circuit 16. The photodiode array 20 shown in FIG. 2 is of the integrating type and between the incremental movements of the lens each photodiode is exposed to light from the document for about 4 ms. As a result, a charge is built-up in each photodiode. At an appropriate time between each scanning step, as controlled by a timing chain 34 which is driven by a clock 33, the charges on the photodiodes of the array 20 are transferred to a shift register 32 via a transfer gate 30. The effect of the charge transfer is to discharge the photodiode array. Once the photodiode signals are transferred to the shift register 32, the motor 17 moves to the next position and the photodiodes began charging again. During this time the contents of the register are serially shifted out of register 32 and through a video amplifier 36.

The output of the video amplifier 36 is applied to one input of black-white decision comparator 38. The other input to the comparator is a threshold value derived from a digital-to-analog (D/A) converter 40. Based on this comparison a decision is made as to whether the photodiode output represents white, i.e. background, or black, i.e. a character bit. With this comparator circuit 38 a digital "1" output represents a black character bit.

In prior art systems the threshold level for the black-white comparator is constant, at least for the duration of the scan across the width of the document being read. However, when the illumination from the fluorescent light is not uniform across the document, the photodiode cells have different relative gain and the lens causes an intensity loss related to the $\cos^4 \theta$, where $\theta$ is the angle between the center axis of the lens and a line from the center of the lens to a location on the document. To compensate for these illumination variations the threshold in the present invention is varied dynamically and automatically for each photodiode, in effect creating individual automatic gain controls by using a different white reference signal for each cell and deriving the threshold level therefrom.

The output of video amplifier 36 is actually a string of 1,728 output levels from the photodiodes and these are sequentially applied to one input of comparator 38 as well as to one input of a comparator 42. In order to generate the threshold level, a white reference memory 48 containing an 8 bit word for each of the 1,728 photodiodes of the array is provided. These 8 bit words represent the maximum white level signal that each photodiode has produced in the recent past. Under the direction of an address control 47, the white reference level stored in memory 48 that corresponds to the photodiode level being applied to comparator 42, is converted to an analog signal in D/A converter 40 and simultaneously applied the other input of that comparator. If the photodiode output is greater (i.e. more white) than the previously stored value, the comparator produces a digital "1" at its output. This comparator output signal is clocked into a D-type flip-flop 43 for temporary storage.

While the white reference comparison is going on, the black-white bit comparison is being performed in comparator 38 using some fraction of the stored white reference signal for that photodiode as the threshold. In the present case the threshold is about 50% of the white level. Like comparator 42 the output of comparator 38 is also temporarily stored in a D-type flip-flop, i.e. flip-flop 39. From flip-flop 39 the digital bits of the black-white comparator for each cell and on each step of the lens during the vertical scan of the document, are transferred to a recognition memory circuit 50 for further processing.

The complimentary output of flip-flop 39 is combined with the output of the flip-flop 43 in AND-gate 45. Thus gate 45 will have an output only if the photodiode output is greater than the previously stored white reference level for that cell and the cell output is not a black bit. When gate 45 has an output it is applied to adder circuit 46 and will add one unit to the white reference level. This new value is then stored in the memory 48 in place of the old value. As a result, the stored white value for a photodiode will continue to increase each scan until it matches the greatest value being seen by the photodiode. The stored value is only incremented by one unit so that the change is gradual and erroneous readings do not unduly upset the system.

If for some reason the illumination reaching a particular cell begins to fade, e.g. due to the fact that the light on the document varies along its length, the comparator 42 is not equipped to reduce the white level stored. This, however, is done by having the timing chain 34 subtract one unit from the stored value periodically, e.g. every few scans. The subtraction is made regardless of the output from comparator 42. Therefore, if the stored white level is correct at the time of the subtraction, it will drop by one unit, but will be incremented back to the correct value on the next scan.

By using this automatic and dynamic adjustment of the white reference levels the effects of illumination variations across the document and along its length are continuously followed, thereby relieving the need to provide strict illumination uniformity or to compensate for nonuniformity with a light source moving with a moving light detector. Also the same circuit that removes the illumination problem eliminates the problem of non-uniform gain for the various photodiodes of the array.

At the beginning of the reading of a document a horizontal scan is made across the width of the document by serially reading out the signals produced by the photocells. The motor then moves the lens down the document so that the next increment, about 5 thousandths from the first, is directed to the photocells. The photocell signals are then read out again. The comparator 38 thus produces strings of 1,728 digital bits for each increment that the motor moves the lens down the paper during the vertical scan. Each string of bits is stored in memory 50 in the form represented in FIG. 3. The columns in FIG. 3 represent the individual photodiodes and the rows represent the scan lines, i.e. the bits in column 1 of FIG. 3 for rows 1–11 represent the successive bits generated from the first photocell for 11 different scans. The memory 50 has room for storing 32 rows of data, which is more than enough scans to cover the height of a character in OCR-B font, which is equal to about 22 scans. Only 11 rows are shown in FIG. 3 because it has been found that an examination of every other row of the 22 rows of a character is sufficient to recognize a character. As an example the pattern formed by the "1" bits in FIG. 3 form the letter "E".

In order to be able to recognize the pattern of 1 bits as a character, the columns of data in the memory for the selected number of rows are sequentially placed on an output bus 52 by address control 51. This output data is then simultaneously applied to separate state machines 54, one state machine being provided for each character that can be recognized. In FIG. 2 the state machines for the letters B and E are shown and FIG. 4 shows a simplified state diagram or map for the letter E recognition state machine. Each state machine includes a field programmable logic array (FPLA) 53 and an output latch 55. These FPLA logic devices are manufactured by Signetics Corp. of Sunnyvale, Calif. as model No. 82S101. The outputs of memory 50 and latch 55 address a location in the FPLA. The contents of the unit at that address are then stored in latch 55 as a new address component. The contents of the latch represent the present state of the machine 54, e.g. state 2 in FIG. 4, and the memory output represents the next input, e.g. "1" bits on rows 1, 2 and 5, 6, 7 and 10, 11, which would cause the machine to go to the next state, i.e. state 3 according to FIG. 4.

A simplified example of the recognition of the letter E can be given in conjunction with FIGS. 3 and 4. In particular, the state machine is first set in an initial state 1. Then as the columns of bits in memory 50 are successively presented to it, it stays in that state until it sees 1 bits in all of the rows 1-11. This would occur when the column 2 data is presented to it and it would cause the machine 54 to shift to state 2 of FIG. 4. If all ones are again detected, i.e. column 3, the machine stays in state 2. This allows the character limb to have some thickness. In column 4 the character has 1 bits in rows 1, 2 and 5, 6, 7 and 10, 11. Thus the machine moves into state 3. Any pattern other than this or all 1 bits, will prevent the machine from going into its next state. The pattern of column 4 can be repeated in columns 5, 6 and 7 while the machine stays in state 3. As soon as all zeros are detected, i.e. column 7, the machine produces an output indicating that the character is an E and it, as well as the other recognition circuits, are reset to their former state. When these machines move into state 1 again, they are each ready to look for their particular letter again. If instead of all zeros, all ones were detected in column 7, this could mean that the character is the letter "B" or the number "8" and this machine would not produce an output, but one of the other circuits would. The output from the other circuit may also be used to reset this machine.

The state diagrams for actual detection circuits must be more complicated then that shown in FIG. 4 in order to uniquely detect the difference between characters, e.g. a "B" and an "8", but they would follow the same general scheme.

As the letters are recognized by the state machines, they are collected and sent to the system requiring the information. The information from the page reader can, for example, be used in a word processor, a facsimile system or any other comparable system. The techniques and circuitry for accomplishing these functions are well known to those skilled in the art and need not be described herein.

While the invention has been particulary shown and described with reference to a preferred embodiment thereof, it will be understood by those skilled in the art that various changes in form and details may be made therein without departing from the spirit and scope of the invention.

I claim:

1. An optical character recognition page reader for reading documents containing characters and for producing an output identifying the characters read, comprising:
    means for receiving and illuminating at least one document to be read;
    an array of light-sensitive elements for converting variations in light patterns on the document due to the characters into variations in an electrical output signal;
    a lens positioned between the document and the array for focusing an image of a portion of a document onto the array;
    lens moving means for moving the lens so that all portions of the document are sequentially focused on the array; and
    an electronic control circuit for recognizing the variations in the outputs of the light sensitive elements as the characters being read on the document and for producing digital outputs in response thereto, said control circuit comprising:
    means for transferring the present outputs of elements in parallel to a shift register;
    means for storing previous maximum white reference signals for each element of the array;
    reference comparator means for comparing the present output of each element of the array delivered in series from the shift register to the pertaining previously stored maximum white reference signal delivered in series from the means for storing, said comparator means producing an output whenever the present output of the element is larger than the pertaining previously stored maximum white reference signal; and
    means for incrementally increasing the value of the previously stored maximum white reference signal whenever the reference comparator means has an output.

2. A reader as claimed in claim 1 further including a character bit comparator means for comparing the present output of each element of the array delivered from the shift register to a threshold level equivalent to a fraction of the pertaining previously stored maximum white reference signal, said character bit comparator producing an output indicative of a black character bit whenever the present output of the element is smaller than the threshold, the output of the character bit comparator inhibiting the output of the reference comparator, whereby the white reference signal is not incremented when a black character bit is detected.

3. A reader as claimed in claim 2, wherein the values of the stored maximum white reference signals are incrementally decreased on a periodic basis.

4. In an optical character recognition system in which portions of characters on a document are imaged onto a photodiode array, each photodiode of the array generating an electrical output related to the portion of the image it receives, the outputs of the photodiodes being serially presented to one input of a character bit comparator for determining whether the outputs represent black character bits or white background bits, the other input of the character bit comparator receiving a reference threshold signal such that the bit comparator generates a black character bit signal whenever the photodiode signal is less than the threshold, the improvement comprising means for generating the reference threshold signal as a plurality of individual levels, wherein one such level is provided for each photodiode of the array and wherein the value of said level is a fraction of the previous maximum signal representing background white generated by that particular photodiode, said means for generating the reference threshold signal comprising:

a white reference comparator receiving in series the present outputs of the photodiodes of the array on a first input;

a white reference storage means for storing a value related to the previous maximum white level signal produced by each particular photodiode;

means for sequentially applying the previous maximum white level signal for each particular photodiode to a second input of said reference comparator simultaneously with the presentation of the photodiode's present output to the first input, said reference comparator producing an output whenever the present output is greater than the pertaining previously stored signal; and adder means for adding one unit to the pertaining previously stored signal whenever the comparator has an output.

5. A system as claimed in claim 4 further including means for inhibiting the output of the reference comparator whenever the character bit comparator has an output.

* * * * *